United States Patent
Rob et al.

(10) Patent No.: US 12,244,264 B2
(45) Date of Patent: Mar. 4, 2025

(54) INTELLIGENT INVERTER USING RECONFIGURABLE CONTROL SYSTEM ALGORITHM

(71) Applicant: SAUDI ARABIAN OIL COMPANY, Dhahran (SA)

(72) Inventors: Rafat Rob, Dhahran (SA); Khaled Alotaibi, Dhahran (SA); Mazen Doal, Dhahran (SA); Dana Nour, Dhahran (SA); Haitham Abdulhadi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 443 days.

(21) Appl. No.: 17/809,800

(22) Filed: Jun. 29, 2022

(65) Prior Publication Data
US 2024/0007048 A1   Jan. 4, 2024

(51) Int. Cl.
*H02S 40/32* (2014.01)
*G05B 19/042* (2006.01)
*H02J 7/35* (2006.01)

(52) U.S. Cl.
CPC ............ *H02S 40/32* (2014.12); *G05B 19/042* (2013.01); *H02J 7/35* (2013.01); *G05B 2219/2639* (2013.01); *H02J 2207/20* (2020.01); *H02J 2300/26* (2020.01)

(58) Field of Classification Search
CPC .................. H02S 40/32; G05B 19/042; G05B 2219/2639; H02J 7/35; H02J 2207/20; H02J 2300/26
See application file for complete search history.

(56) References Cited

U.S. PATENT DOCUMENTS

| | | | |
|---|---|---|---|
| 10,971,937 B2 | 4/2021 | Khajehoddin et al. | |
| 2008/0236648 A1 | 10/2008 | Klein et al. | |
| 2018/0233921 A1* | 8/2018 | Kangas ............ | H02J 3/38 |

FOREIGN PATENT DOCUMENTS

| | | |
|---|---|---|
| CA | 2681196 A1 | 10/2008 |
| CN | 110556859 A | 12/2019 |

OTHER PUBLICATIONS

R. Aborub and M. M. Morcos; "Modified Models of the Current-Programmed Buck and Boost Regulator", IEEE; Proceedings of the 34th Midwest Symposium on Circuits and Systems; May 14, 1992; pp. 179-183 (5 pages).

(Continued)

*Primary Examiner* — Carlos Amaya
(74) *Attorney, Agent, or Firm* — Osha Bergman Watanabe & Burton LLP

(57) ABSTRACT

An inverter includes an input terminal that receives output power of a first power type from a solar panel array and an output terminal that transmits output power of a second power type. The inverter further includes a processor that receives a control algorithm via a network connection and controls the inverter based upon the received control algorithm. The control algorithm is determined by applying a transformation to a state vector representative of the inverter and the solar panel array to relocate eigenvalues of the state vector from an initial control region to a stable control region, and determining the control algorithm based upon the relocated eigenvalues.

20 Claims, 7 Drawing Sheets

(56) References Cited

OTHER PUBLICATIONS

A. S. Arar et al.; "Optimization of Continuous System With Closed-Loop Poles Inside a Rectangular Region", IEEE; Proceedings of the American Control Conference; vol. 3; Jun. 1994; pp. 3559-3560 (2 pages).
E. Kabalci and A. Boyar; "Design and Analysis of a Micro Inverter for PV Plants", ECAI 2017—International Conference; 9th Edition; Jun. 29, 2017; pp. 1-6 (6 pages).
W. Souhail et al.; "Optimal Tradeoff between MPP and Stability of a PV-Based Pumping System", Energies; vol. 15; No. 1106; Feb. 2, 2022; pp. 1-19 (19 pages).
Hun-Chul Seo and Chul-Hwan Kim; "Analysis of Stability of PV System using the Eigenvalue according to the Frequency Variation and Requirements of Frequency Protection", Journal of Electrical Engineering & Technology; vol. 7; No. 4; 2012; pp. 480-485 (6 pages).
Khayamy, Mehdy et al, "Peculiar dynamics of the stand-alone current source converter based photovoltaic system", 2015 IEEE Energy Conversion Congress and Exposition (ECCE), IEEE,Sep. 20, 2015 (Sep. 20, 2015), p. 5757-5762 (6 pages).
Xu, Yanhui et al, "Stability Analysis and Control of Two-Stage Three-Phase Photovoltaic Grid-Connected System with Phase-Locked Loop", 2018 2nd IEEE Conference on Energy Internet and Energy System Integration (EI2), IEEE,Oct. 20, 2018 (Oct. 20, 2018), p. 1-6 (6 pages).
International Search Report issued in International Application No. PCT/US2023/026360 dated Oct. 20, 2023 (3 pages).
Written Opinion issued in International Application No. PCT/US2023/026360 dated Oct. 20, 2023 (9 pages).

\* cited by examiner

INTELLIGENT INVERTER USING RECONFIGURABLE CONTROL SYSTEM ALGORITHM

BACKGROUND

In the process of converting solar energy into usable power, solar panels in an array may become shaded due to numerous factors. These factors may include, but are not limited to, nearby objects that extend above the solar panels, self-shading between panels, horizon shading from the terrain or elevation changes, or controllable factors such as solar panel orientation. Furthermore, shaded solar panels produce less power than their unshaded counterparts, and can cause array-wide inefficiencies due to the restricted flow of current from the shaded solar panel(s).

To address the above deficiencies in solar panel arrays, inverters are often used to control the process of converting the solar energy into usable power. These inverters may be equipped with Global Maximum Power Point Tracking (GMPPT) functionality, which tracks the power output of the individual solar panels throughout the day. However, dynamic changes in the ambient environment can be challenging to account for, as the changes may stem from transient conditions, such as weather, or permanent changes, such as damages to the solar panel array. Furthermore, once a solar panel inverter is configured with a control algorithm, the algorithm is typically not updated to account for the dynamic changes in solar panel array environment, which introduce further errors in the GMPPT process.

SUMMARY

In general, in one aspect, embodiments disclosed herein relate to an inverter that includes an input terminal that receives output power of a first power type from a solar panel array and an output terminal that transmits output power of a second power type. The inverter further includes a processor that receives a control algorithm via a network connection and controls the inverter based upon the received control algorithm. The control algorithm is determined by applying a transformation to a state vector representative of the inverter and the solar panel array to relocate eigenvalues of the state vector from an initial control region to a stable control region, and determining the control algorithm based upon the relocated eigenvalues.

In general, in one aspect, embodiments disclosed herein relate to a system for controlling an output power of an inverter. The system includes an input terminal that receives output power of a first power type from a solar panel array and an output terminal that transmits output power of a second power type. The inverter further includes a processor that receives a control algorithm via a network connection and controls the inverter based upon the received control algorithm. The control algorithm is determined by applying a transformation to a state vector representative of the inverter and the solar panel array to relocate eigenvalues of the state vector from an initial control region to a stable control region, and determining the control algorithm based upon the relocated eigenvalues. Once the control algorithm is determined, the inverter converts power from the solar panel array from the first power type to the second power type according to the determined control algorithm.

In general, in one aspect, embodiments disclosed herein relate to a method of controlling an output power of an inverter that includes determining a state vector representative of a system including the inverter and a solar panel array. The state vector is transformed to relocate eigenvalues from an initial control region to a stable control region. Based upon the state vector, a control algorithm for controlling the inverter is determined. The inverter is then controlled to convert power from the solar panel array from a first power type to a second power type according to the determined control algorithm.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

DETAILED DESCRIPTION

Figure 1:
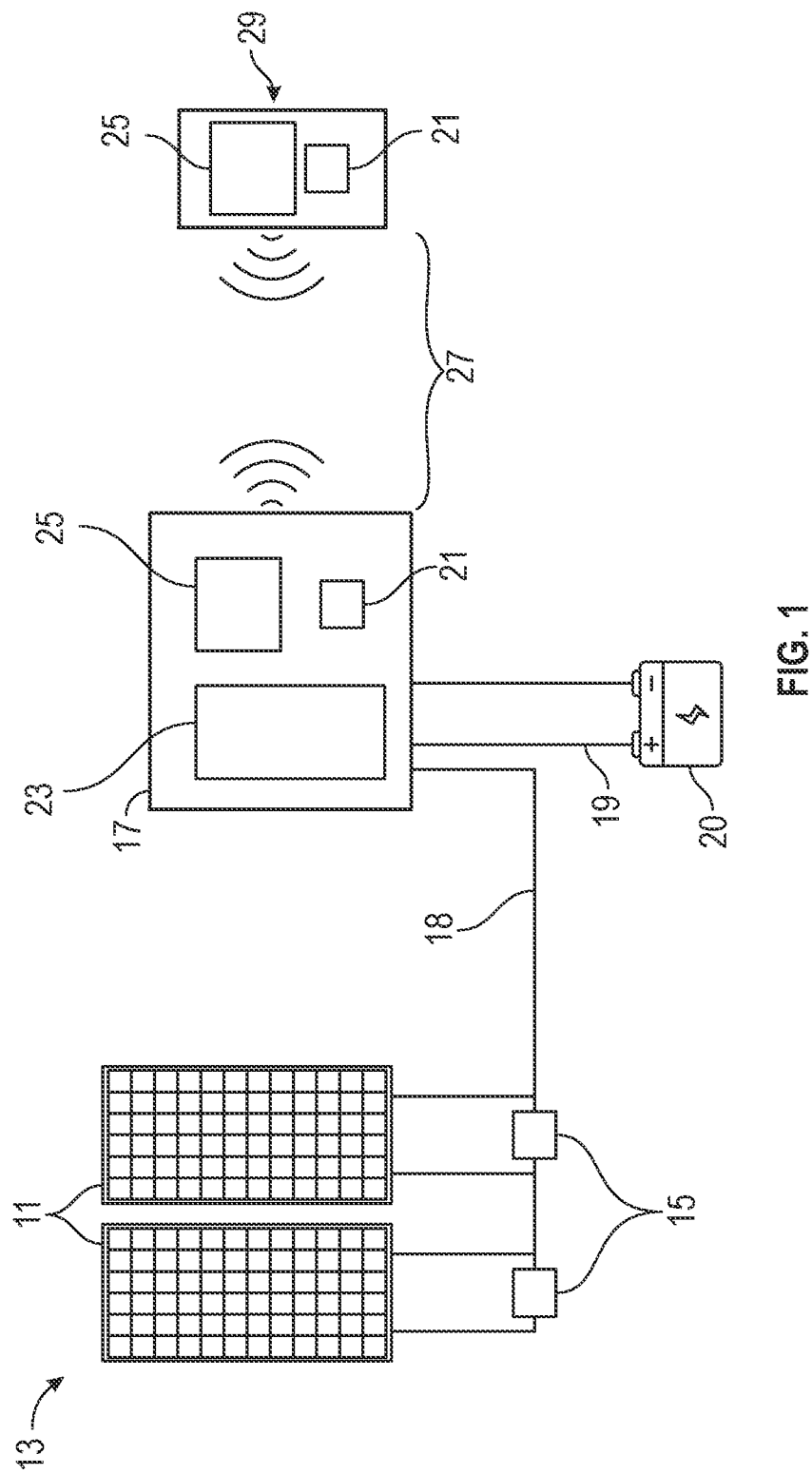
FIG. 1 shows a system in accordance with one or more embodiments of the invention.

Specific embodiments of the disclosure will now be described in detail with reference to the accompanying figures. In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In one aspect, embodiments disclosed herein relate to an inverter built upon a reconfigurable fabric architecture such that a control algorithm that controls the inverter is able to flexibly adjust the inverter's operation according to ambient operating conditions. The control algorithm is developed by an Internet of Things (IoT) controller, and is wirelessly transmitted from the IoT controller to the inverter.

In order to develop the control algorithm, a mathematical model of a system including the solar panel array is developed and processed. The mathematical model is a state space model of the system and includes a control signal, a state vector, a system matrix, and an input matrix. More specifically, the process for determining the control algorithm includes processes of determining eigenvalues of the system matrix, creating a weighting matrix that transforms the eigenvalues, and controlling the process of converting power based upon the weighting matrix. The control algorithm is then transmitted to the inverter, and the inverter is then operated according to the determined algorithm.

The controller may also connect to multiple inverters, in which case the controller can control the multiple inverters as an array. During this process, the controller treats each panel and inverter as a separate input to the state vector, and activates or deactivates the individual inverters at the behest of the control algorithm. Alternatively, the controller can control multiple inverters by transmitting a single control algorithm to each inverter, such that the individual inverters each have a different control algorithm. Accordingly, embodiments of the invention are applicable to small and large scale solar arrays, the process of converting output power thereof, and methods of generating control algorithms for inverters.

FIG. 1 depicts a physical system overview in accordance with one or more embodiments of the invention. As shown in FIG. 1, the system includes a solar panel array 13, an inverter 17, and a controller 29. The solar panel array 13 is connected to the inverter 17 and is formed by a series of solar panels 11. The structure of the solar panels is routine in the art; the solar panels are formed as a series of silicon layers stacked between encapsulant layers, which may be glass or an elastomeric polymer. The output wires of the solar panel array 13 are connected to the inverter 17 at the input terminal 18, which receives output power of a first type, such as direct current (DC), from the solar panel array 13 and outputs synchronized power of a second type, such as alternating current (AC), at its output terminals 19 to a battery 20 or other output device.

As shown in FIG. 1, the connection between each of the solar panels 11 and the input terminal 18 of the inverter 17 includes a bypass diode 15. Each bypass diode 15 is configured to be selectively biased in order to allow or prevent current from flowing from the solar panel 11 to the inverter 17. In particular, in order to prevent overloading shaded cells of the solar panel array 13, the bypass diode 15 may be forward biased during regular operation in which case current flows freely from the respective solar panels 11 to the inverter 17 via the input terminal 18, but prevents current from reversing into the solar panel 11. As a result, a shaded solar panel 11, which has a higher resistance than its non-shaded counterpart, may be bypassed in order to avoid overloading the shaded solar panel 11 or wasting power thereon. Furthermore, the bypass diodes 15 prevent the individual solar cells 11 from supplying power to each other.

Overall, the system of FIG. 1 is controlled according to instructions generated by the controller 29. The controller 29 contains communication module 25 and a processor 21, which serve to generate and transmit instructions to the inverter 17 via a network connection 27. The network connection 27 is a wireless connection using high-level communication network protocols, such as Wi-Fi or Zigbee®. Consequently, the controller 29 forms, with the solar panel array 13 and the inverter 17, an Internet of Things (IoT) or Internet of Everything (IoE) network. Although depicted as being wirelessly connected to the controller 29 via the network connection 27, the inverter 17 may alternatively be connected to the controller via a wired connection (not shown) such as ethernet, or an offline wireless connection such as Bluetooth® or Near Field Communication (NFC).

As noted above, the inverter 17 receives DC voltage from the solar panel array 13 and outputs synchronized AC voltage at its output terminals 19 to a battery 20. To do such, the inverter 17 includes output terminals 19, a processor 21, a reconfigurable fabric circuit 23, and a communication module 25. During a power conversion process, the inverter 17 receives a control algorithm from the controller 29 via the network connection 27 and the communication module 25. The control algorithm comprises a series of instructions, enacted by the processor 21 and the reconfigurable fabric circuit 23, that increases or decreases the current of a circuit commensurate with voltage changes, which may be environmentally related as described above. Accordingly, when the processor 21 issues a control command to the reconfigurable fabric circuit 23, the reconfigurable fabric circuit 23 increases or decreases the output power of the inverter 17 responsive to the control command.

Because the microinverter operates with a non-optimized (or non-existent) inverter algorithm prior to receiving an algorithm from the controller 29, the process starts by transmitting voltage and current output from the solar panel array 13 to the controller 29. This process may be facilitated with voltage, current, and/or power sensor(s) (not shown) that sense the respective voltage, current, and/or power output by the solar panel array 13. The sensor transmits the voltage, current, and/or power values to the processor 21 of the inverter 17, and the inverter 17 transfers the values to the controller 29 via the network connection 27. The controller 29 logs the voltage and current over a period of time, during which the controller performs maximum power point tracking and determines the minimum, average, and maximum outputs of the solar panel. These values may be stored, for example, in a graph of the form shown in FIG. 2, which is further discussed below. As the most efficient inverters assume an open-loop current source, the controller 29 assumes that the output current of the solar panel array 13 does not depend on the input current when logging and tracking system power outputs.

Continuing with FIG. 1, the control algorithm is developed by the processor 21 of the controller 29, and is initiated by developing a mathematical state space model of the entire system depicted in FIG. 1. The state space model is initially developed by abstracting the circuit into state space notation, which is performed by the processor 21 and further described below. As the orientation and configuration of the solar panels varies according to the environment and application of the solar panel array 13, the inverter 17 initiates the process by assuming the solar panel array 13 is a controllable system of the form shown below:

$$x'(t)=Ax(t)+Bu(t) \qquad (1)$$

where A is a system matrix representing physical components of the system, B is an input matrix representing control inputs, u(t) is a control signal, and x(t) is a state vector that is representative of the current and voltage output of the solar panel array as a function of time. Accordingly, Ax(t) represents the physical system signals while Bu(t) represents the control signals and their weights.

For a solar panel array 13 or other photovoltaic systems, the state vector x(t) can be determined according to a variety of methods. In its most common form, the state vector is a two row vector containing the instantaneous voltage and current signals received by the inverter 17 from the solar panel array 13, and the inverter 17 provides instantaneous feedback by applying the control signal u(t), which is derived from the instantaneous voltage and current. In other instances, the state vector can be formed as a vector containing the voltage and current as a function of time. For example, the processor 21 may use GMPPT to track the voltage and current of the solar panel array 13 over a period of days, assume that the voltage and current will follow similar patterns in order to avoid having to receive feedback from the solar panel array 13, and determine the state vector x(t) according to the assumed voltage and current. Alternatively, voltage and current output models (which may be generated using solar irradiance or circuit modelling software) of the solar panel array 13 may be input to the processor 21 during the installation process according to manufacturing specification, ambient weather conditions, etc.

Accordingly, the control algorithm is developed as a function of a control signal, u(t), which may be, for example, a signal to control whether the output current and/or voltage of the inverter 17 is stepped up or stepped down. The control signal u(t) is related to the state vector x(t) by the following equation, where F is a feedback gain matrix and $x_r(t)$ is a reduced system matrix, which is further described below.

$$u(t) = -Fx_r(t) \quad (2)$$

The feedback gain matrix F is a function of input and control matrices of the system, G and M, as shown in equation (3), below.

$$F = -G^T M \quad (3)$$

In equation (3), G is defined to be an input matrix related to the input matrix B by formula (4), below. In formula (4), $\lambda_A$ denotes the left eigenvector of system matrix A.

$$G = B\lambda_A \quad (4)$$

Similarly, M is defined to be a control matrix of the form shown in equation (5), which is determined according to the control signal u(t) and a pseudo control variable v. The values of the pseudo control variable v may vary between the minimum voltage and maximum voltage output by the inverter, and is used to ensure that the process of determining a control signal as specified in equation (2) converges on a solution. Values of the pseudo control variable v may be selected by the processor randomly, or the processor may choose values of v in order to minimize or maximize outputs of equations (6), (10), and/or (11), below. Furthermore, the pseudo control variable v may be changed during the stability analysis in order to converge on a desired output value.

$$M = v^T u(t) \quad (5)$$

Because the control matrix M and the control signal u(t) are fed back into the system, the control signal u(t) is determined to be the optimal control signal u(t) that minimizes a performance index J as shown in equation (6). Accordingly, equation (6) is used as the control algorithm for the inverter 17, where the processor 21 of the controller 29 and the processor 21 of the inverter 17 operate to minimize the performance index J. In equation (6), Q and R are weighting matrices that shift the values of the control signal u(t) and the state vector x(t).

$$J = \frac{1}{2}\int_0^\infty \left(x^T(t)Qx(t) + u^T Ru(t)\right)dt \quad (6)$$

The determination of Q and R is not trivial, and is commonly found by trial and error. However, the experimental nature of trial and error results in different dynamic outputs of the circuit, which cause inverter inefficiencies in the control process. Furthermore, dynamic factors, such as shading conditions or panel damage, necessitate that the weighting matrices Q and R are repeatedly calculated to ensure optimal power conversion.

To avoid the aforementioned trial and error process, the weighting matrices Q and R are determined based upon a stable control region of the system. The stable control region is defined according to GMPPT data, such that when a system has eigenvalues located in the stable control region the resultant control algorithm is operating in the maximum power output range identified by the GMPPT data. In particular, the stable control region may be defined, for example, such that the output power from the solar panel array 13 is outputting power above a power threshold derived from the GMPPT data, or such that the output power from the array is within an acceptable error margin of the maximum power point of the solar panel array 13. The thresholds and error margins may be predetermined by manufacturer or operator specification, or according to environmental or other factors.

Figure 2:
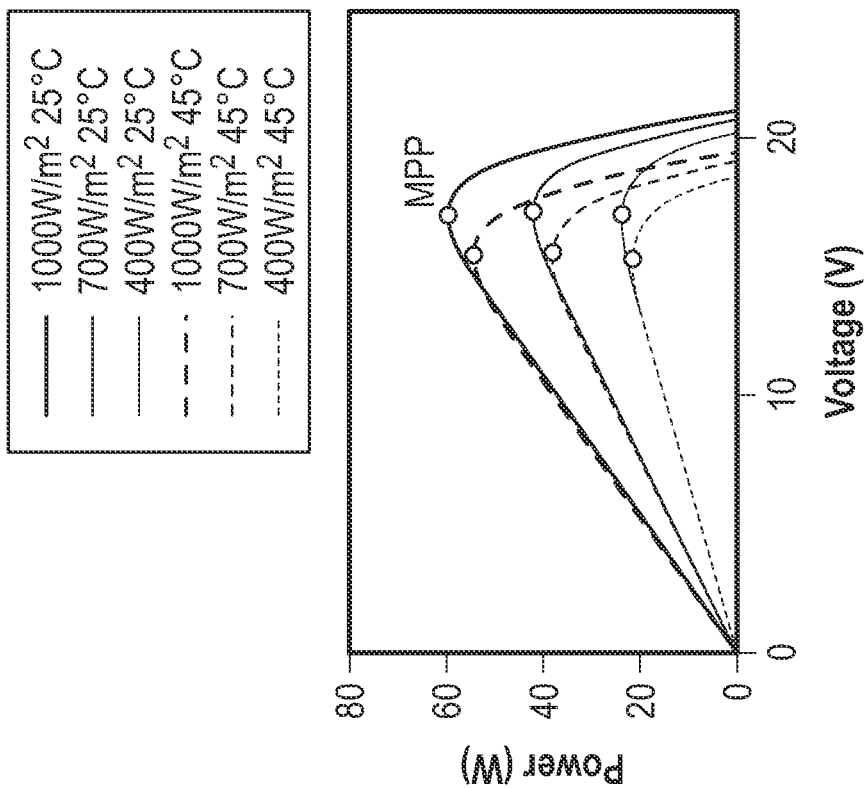
FIG. 2 depicts a maximum power point tracking graph in accordance with one or more embodiments of the invention.
Figure 2:
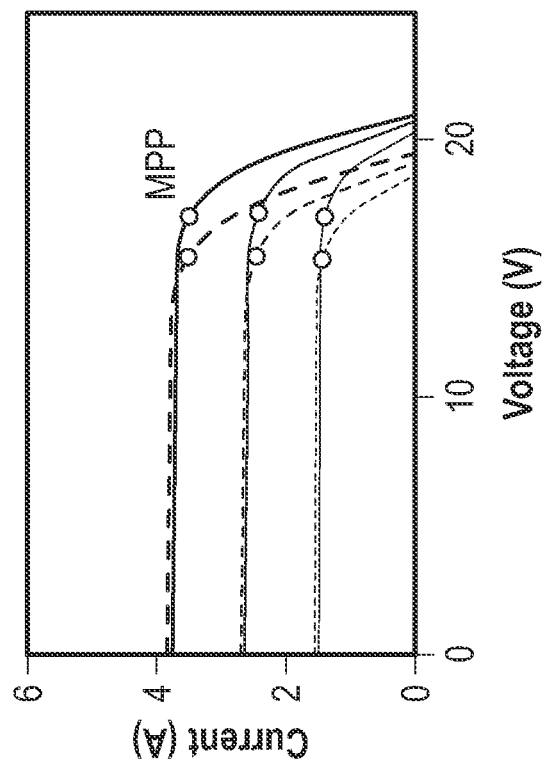

One example of GMPPT data is shown in FIG. 2, which depicts the tracked output power and current of the solar panel array 13 as a function of the voltage generated by the solar panel array 13. As shown in FIG. 2, the output current and power are tracked over a period of time for a minimum temperature of 25 degrees Celsius and a maximum temperature of 45 degrees Celsius. The power output is also tracked according to its efficiency of the solar panel array 13, of which 1000 W/m$^2$, 700 W/m$^2$, and 400 W/m$^2$ efficient panels are analyzed. The efficiency may vary according to manufacturer specification or location irradiance, while the solar panel array 13 temperature varies according to the ambient weather conditions.

Regardless of the efficiency or ambient temperature thereof, FIG. 2 depicts that the maximum power point is the location at which the power is highest. Specifically, because power is a function of the current and voltage of a circuit, the maximum power point will always be the highest multiplicative combination of the voltage and current shown in the left diagram, or the peak power of the right diagram of FIG. 2. Accordingly, the stable control region, described herein as being related to a global maximum power point, may be described as a fraction of the highest point of the power graph of FIG. 2, which may be determined by an operator according to the use case of the inverter or determined as a required amount of output power to achieve a specific function, such as charging a battery 20 or other device.

Returning to FIG. 1, as it is assumed that the system does not initially have eigenvalues located in the stable control region, the eigenvalues must be relocated to the stable control region prior to calculating the weighting matrices Q and R. Accordingly, in order to simplify the determination of Q and R, the order of the system is reduced as shown in equation (7), below, where $x_r(t)$ is a reduced system matrix and $\lambda_A$ denotes the left eigenvector of system matrix A.

$$x_r(t) = \lambda_A x(t) \quad (7)$$

The calculation of the eigenvalues is routine in the art, and may be realized by finding the roots of a characteristic equation of the form $|A-\lambda|\cdot I|$, where A is the system matrix (or other matrices) described above, $\lambda$ denotes an eigenvalue of the system matrix A, and I represents an identity matrix with the same dimensions of matrix A.

The reduced system matrix $x_r(t)$ is then related to the control signal u(t) and system matrix A by formula (8). Within formula (8), W denotes a system matrix that encompasses the system matrix A and its associated eigenvalues after system order reduction, while G is an input matrix that encompasses input matrix B and its associated eigenvalues after system order reduction.

$$x_r(t)=Wx_r(t)+Gu(t) \qquad (8)$$

Figure 3:
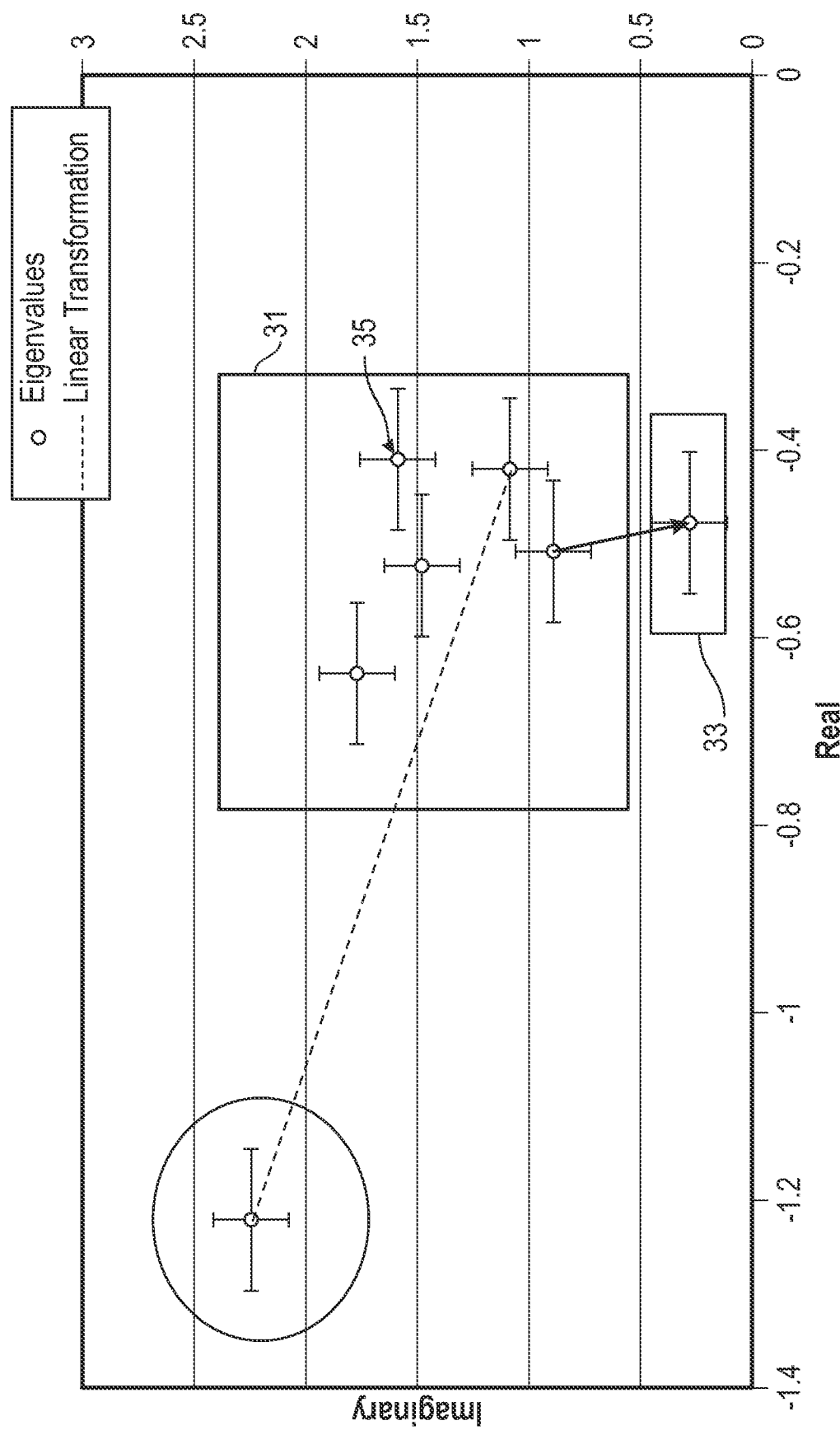
FIG. 3 depicts an S-plane diagram of system eigenvalues in accordance with one or more embodiments of the invention.

Once the system order is reduced, the eigenvalues of the system are relocated from an initial control region 31 to a stable control region 33 to ensure system stability and facilitate the Q and R weighting matrix determination process. FIG. 3 depicts one example of the stable control region and the relocation process in the form of an S-Plane diagram. As shown in FIG. 3, the eigenvalues 35 of the system are originally located in an initial control region 31 that delimits the potential locations of the eigenvalues 35 prior to relocation.

Relocation of the eigenvalues is achieved by applying a control signal u(t) according a weighting matrix Q that causes the eigenvalues 35 to relocate to the stable control region 33. The stable control region 33 is defined, in part, according to equation (9), which requires that the stable control region $Q_{control}$ is related to the left eigenvector $\lambda_A$ and its transpose.

$$Q_{control}=\lambda_A Q_{control} \lambda_A^T \qquad (9)$$

As shown in FIG. 3, the stable control region 33 identified by equation (9) is disposed closer to the origin of the S-Plane than the initial control region 31, and, thus, is more stable than the initial control region 31. Consequently, eigenvalues 35 located in the stable control region 33 will also be more stable than their non-relocated counterparts in the initial control region 31. Moreover, as the stable control region is placed in a location where all eigenvalues must be non-negative in relation to the real axis, the system will always have positive semidefinite stability.

Because the eigenvalues 35 are independent of each other, they must be relocated to the stable control region 33 in a recursive and sequential process. Accordingly, the weighting matrix Q is formed of a series of individual weighting values, Qi, that individually relocate a corresponding eigenvalue to the stable control region 33. The general weighting matrix Q can be found by equation (10), where λ denotes system eigenvalues, M denotes the aforementioned control matrix, and G denotes the input matrix.

$$Q=-2\lambda M+MGG^T M \qquad (10)$$

In addition, individual values $Q_i$ of the general weighting matrix Q can be found according to equation (11), below, where i denotes an index of an individual eigenvalue or eigenvalue set. Specifically, equation (11) is a positive, semi-definite Riccati equation that relates the individual weighting matrix values $Q_i$ to the control matrix M, the pseudo control variable v, the input matrix G, and the system matrix W.

$$Q_i=M_i^T M v_i - M_i v W_i + M_i W G_i G_i^T M W_i \qquad (11)$$

Once individual values of $Q_i$ are known, these values are agglomerated into the general weighting matrix Q, which must obey the relationship of equation (10).

Returning to FIG. 1, once the eigenvalues are relocated, and Q is known to be the weighting values that transpose the eigenvalues, the processor 21 must determine a value for the system weighting matrix R. The weighting matrix R relates to the eigenvalues as shown in equation (12). In equation (12), H denotes the stable eigenvalues after the transformation, while M is the aforementioned control matrix, u is the aforementioned control signal, $R^+$ is the pseudo inverse of the system weighting matrix R, and $b_i$ is the value of the input matrix at index i.

$$R^+_{i+1}H^T_{i+1}=W^T_i - b^T_i M_i M^T_i + b^{Fr}_i u^{i+1} \qquad (12)$$

The pseudo inverse may be calculated using the Moore-Penrose method, for example, or any other suitable method of calculation. Once the pseudo inverse $R^+$ of the weighting matrix R is known, the pseudo inverse is inverted to get the system weighting matrix R.

As the values of Q and R are now known to the processor 21, the processor 21 can now determine the value of the control signal u(t). Furthermore, because the Q and R weighting matrices are known, the processor 21 uses the performance index J of equation (6) as a control algorithm to perpetually control the inverter 17, where the system is controlled such that the control signal u(t) is always the control signal that minimizes the performance index J.

In order to transmit the control algorithm from the processor 21 of the controller 29 to the inverter 17, the control algorithm is transmitted from the processor 21 of the controller 29 to the communication module 25 of the controller 29. The control algorithm is then wirelessly transmitted via the network connection 27 from the communication module 25 of the controller 29 to the communication module 25 of the inverter 17. The communication module 25 of the inverter 17 then transmits the control algorithm to the processor 21 of the inverter 17. The processor 21 of the inverter 17 controls the reconfigurable fabric circuit 23 according to the control algorithm such that the reconfigurable fabric circuit 23 increases or decreases the output voltage according to the control signal u(t).

Figure 4:
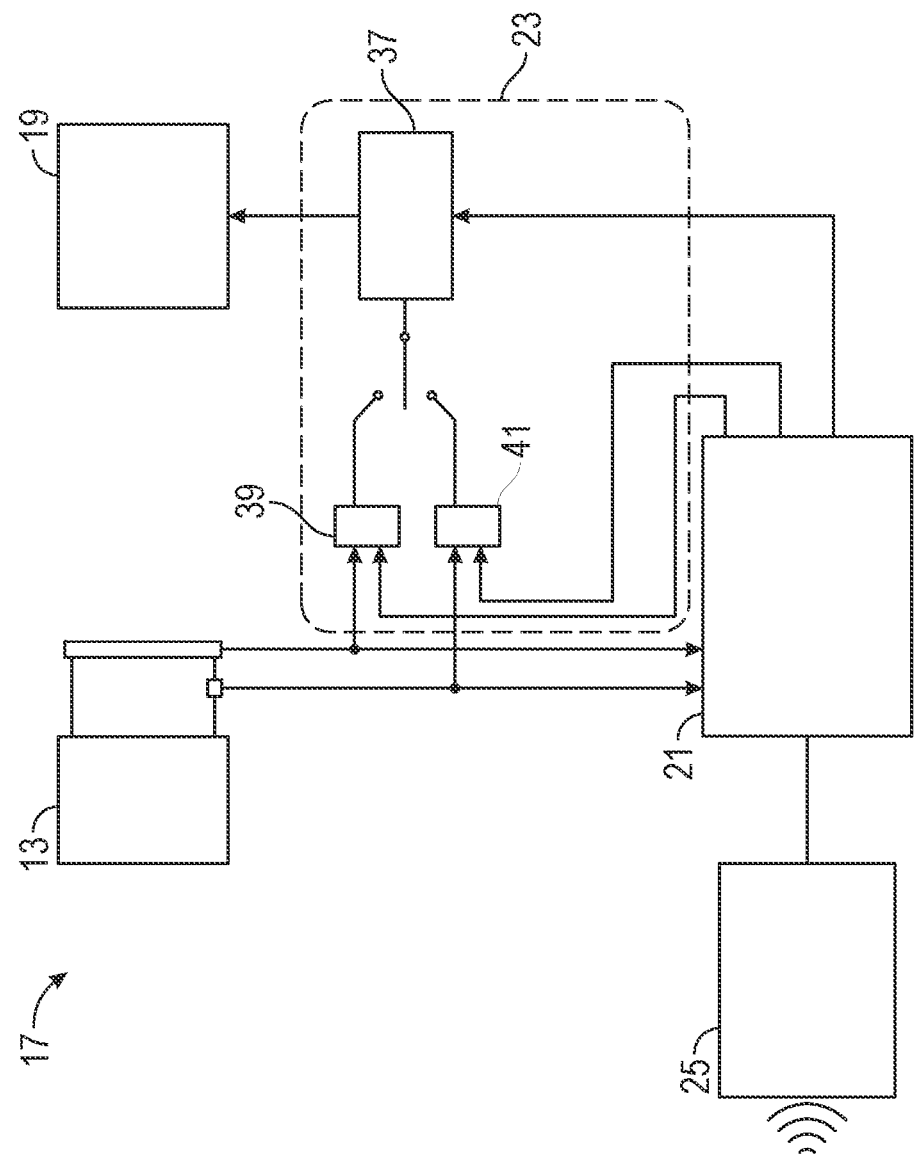
FIG. 4 depicts a device in accordance with one or more embodiments of the invention.

FIG. 4 shows an example of an inverter 17 as described above. As shown in FIG. 4 and as further detailed above, the inverter 17 comprises a processor 21 connected to a communication module 25, the solar panel array 13 and a reconfigurable fabric circuit 23. The reconfigurable fabric circuit 23 is connected to the output terminals 19, and changes the ratio of voltage and current supplied to the output terminal 19 by selectively connecting the output terminals 19 to the solar panel array 13. Components of the inverter 17 depicted in FIG. 4 that are substantially similar to their counterparts in FIG. 1 are not further described for the sake of brevity.

At its core, the reconfigurable fabric circuit 23 is formed as a logic-controlled switch 37, a voltage gate 39, and a current gate 41 that connect the solar panel array 13 to the input terminals 18, the output terminals 19, and the processor 21. The voltage gate 39 is connected to a first terminal that measures the voltage drop across the output terminals of the solar panel array 13, and is further connected to a target voltage terminal that receives a target voltage from the processor 21. Similarly, the current gate 41 is connected to a first terminal that transmits the current output from the solar panel array 13, and is further connected to a second terminal that transmits the target current output of the system from the processor 21. The target voltage and target current are derived from the control signal u(t).

By virtue of the switch 37 being directly connected to the processor 21, the switch 37 is controlled via instructions from the processor 21 according to the control algorithm containing the control signal u(t). As noted above, the control algorithm is determined by the controller 29 and transmitted to the communication module 25 of the inverter 17, which then transmits the control algorithm containing the control signal u(t) to the processor 21 of the inverter 17. Thus, when the control signal u(t) dictates that the voltage of the output terminals 19 is lower than a desired voltage, the switch 37 connects to the voltage gate 39 until the voltage at the output terminals 19 matches the target voltage, as identified by the voltage gate 39. Similarly, if a current increase is required, the switch 37 connects to the current gate 41 until the current at the output terminals 19 matches the target current.

In addition to being connected to the solar panel array 13, the inverter 17 may be connected to an additional power source (not shown), which may be, for example, a battery. If the processor 21 recognizes that additional voltage is necessary to provide consistent power output, the processor 21 may direct the switch 37 to connect to the battery in order to supply supplemental power to the inverter 17. The inclusion (or lack thereof) of a battery is based upon the power output of the solar panel array 13 and its contemplated use case.

The reconfigurable fabric circuit 23 is also configured to convert the direct current output of the solar panel array 13 to alternating current using a similar process. Specifically, the switch 37 may connect to the voltage gate 39 and/or current gate 41 in oscillatory fashion, creating AC phases in the power output by the output terminals 19. The DC-to-AC conversion is routine in the art, and is not further covered in the interest of brevity.

Figure 5:
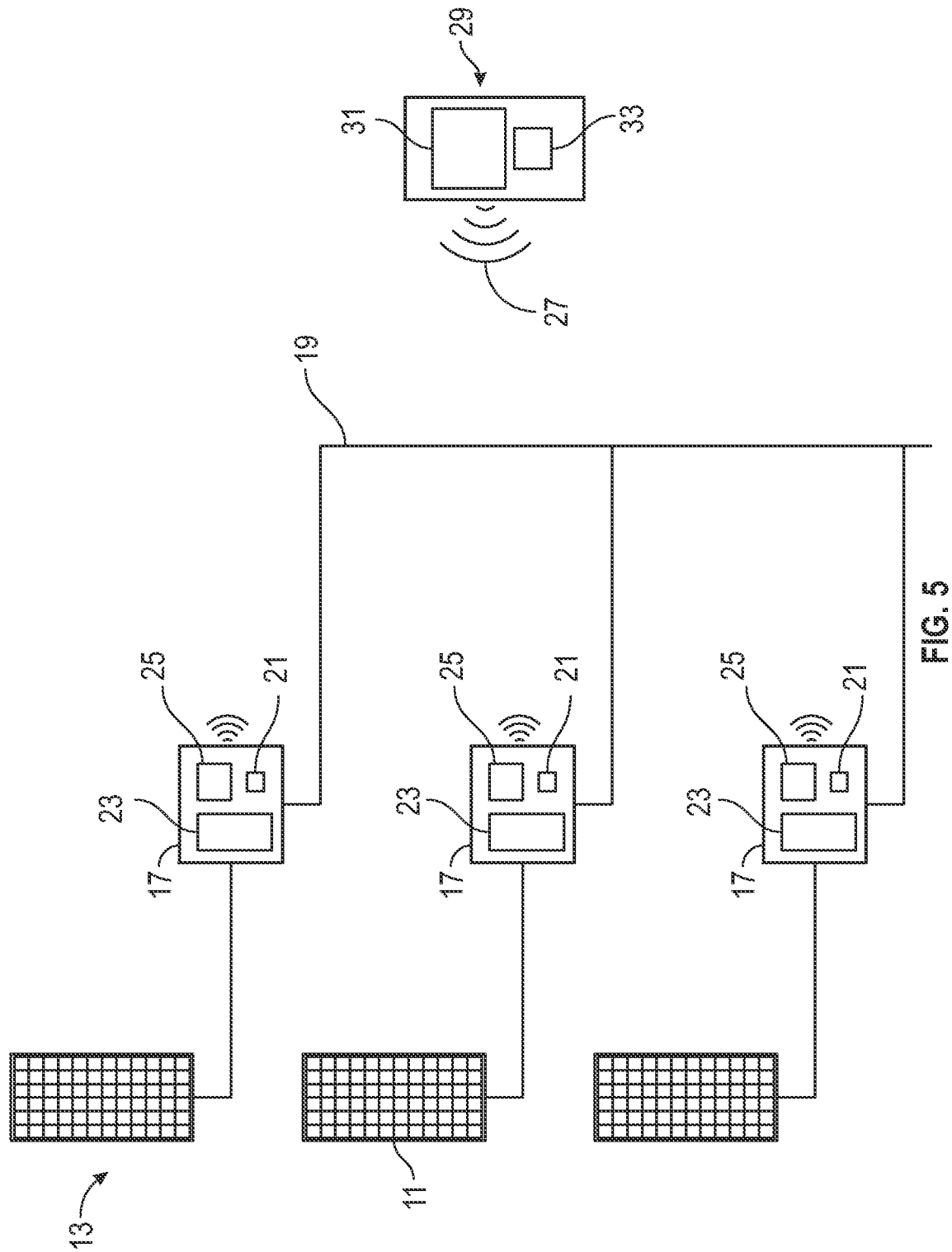
FIG. 5 depicts a system in accordance with one or more embodiments of the invention.

Due to the reconfigurable nature of the reconfigurable fabric circuit 23, and that the processor 21 of the inverter 17 receives its instructions wirelessly via the network connection 27, the controller 29 can also control multiple inverters 17 by establishing wireless connections with each inverter 17. One such embodiment is depicted in FIG. 5, which demonstrates that multiple inverters 17, each connected to a separate solar panel 11, are connected to a single controller 29. Thus, the individual inverters 17 operate as microinverters that each control a single solar panel 11 according to the formula output by the controller 29. Elements of FIG. 5 that are substantially similar to elements of FIG. 1 use the same numbering for consistency. Furthermore, descriptions of the substantially similar elements have been omitted for the sake of brevity.

When the controller 29 is connected to multiple inverters 17 as shown in FIG. 5, two separate modes of operation may be used. In a first mode, the controller 29 treats each inverter 17 and its associated solar panel 11 as individual arrays, and sends separate control algorithms to each inverter 17 such that each inverter 17 is operated within the stable control region 33. The control algorithms are determined as described above, and the controller 29 collects the outputs of each solar panel 11 and returns a control algorithm for the specific solar panel 11.

The first mode may be used in cases where the maximum power output is always required, or when the solar panel array 13 is placed in a region of consistent sunlight with relatively low volatility. In particular, because each inverter 17 operates according to its own control algorithm, the system may be considered to be always converting the maximum amount of solar power available, regardless of how the array is shaded. However, such may also come with the computational and/or electrical cost of always operating every solar panel 11 and its corresponding inverter 17.

Accordingly, the processor 21 may operate according to a second operation mode, in which case the processor 21 treats the individual solar panels 11 and their corresponding inverters 17 as a single array. In this case, the processor 21 of the controller 29 treats each solar panel 11 as a separate input of the state vector x(t), and calculates a state vector for the entire solar panel array 13 containing the individual panels 11. The processor 21 then selectively directs the inverters 17 to control their individual panels 11. If any of the outputs of a process for controlling the solar panel 11 based upon the state vector indicate that a voltage from a respective solar panel 11 is unnecessary (such as a control signal u(t) with a non-positive value), the controller 29 directs that inverter 17 to cease operation, in which case the particular inverter 17 will not actuate the switch 37.

The second mode may be used in cases where efficiency is valued, in cases of high volatility, or if a solar panel 11 becomes damaged. Specifically, because the second mode allows microinverters to be selectively deactivated, power is not wasted in trying to adjust the voltage of solar panels that are not performing optimally. However, the second mode of operation demands a high computational cost from the controller 29, and, thus, the first mode may be more beneficial in situations where processing time is essential or when the system is stable. The method of operation of the controller 29 is determined by an operator during system installation according to the contemplated use case. However, the operation mode may be adjusted by the operator at a later date based on changes to the system or a user request, which may be implemented by directing the processor 21 to change its operating mode. It is also within the bounds of the invention that multiple solar panel arrays 13 may be controlled by a single controller 29, in which case the controller 29 separately determines a control algorithm for each solar panel array 13.

Figure 6:
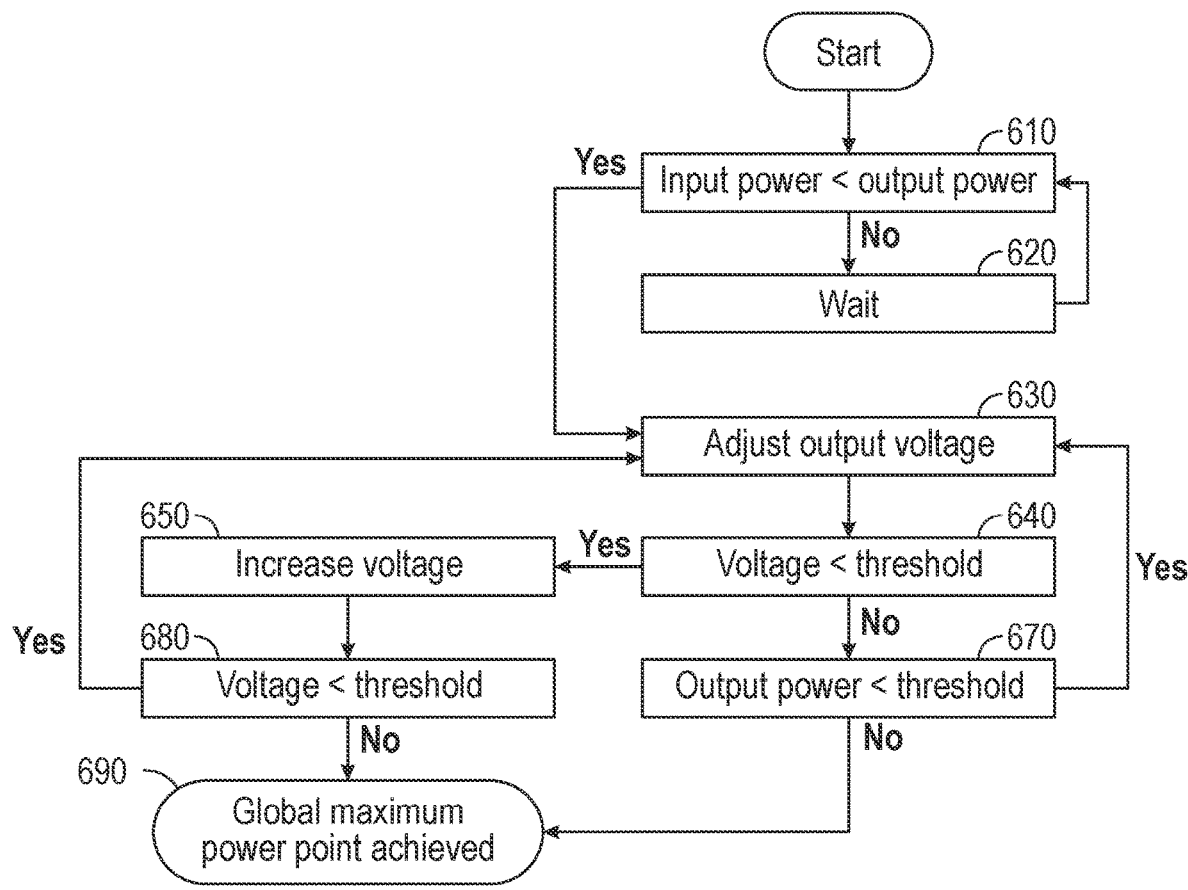
FIG. 6 depicts a flowchart of a method in accordance with one or more embodiments of the present disclosure.

FIG. 6 depicts a flowchart describing a process of determining whether the solar panel array 13 is achieving maximum power throughput. The steps of FIG. 6 may be performed, for example, by the processor 21 of the controller 29, or the processor 21 of the inverter 17. As shown in FIG. 6, the process starts at step 610, at which point the processor 21 determines whether the power output by the inverter 17 is greater than the amount of input power received. When the output power is greater than the input power, the process continues to step 630, at which point the output voltage is perturbed, as described below. Alternatively, when the output power is less than the input power the processor 21 waits at step 620 until the input power is less than the output power. As the output power depends on the position of the sun, a step of waiting may be for a period of minutes or hours until the amount of sunlight received by the solar panel array 13 changes.

At step 630, the processor 21 introduces a minor voltage perturbation to the solar panel array 13. At this time, the processor 21 of the inverter 17 connects the switch 37 to the voltage gate 39 for a brief period of time (e.g., less than 5 seconds), which causes additional power to flow into the inverter 17, causing a minor fluctuation in the overall power output of the system. If the system is stable and functioning from a controls perspective, then the voltage perturbation causes the voltage output by the system to increase. However, if the derived control algorithm does not have stability, the voltage perturbation may cause a decrease in power output (which may be caused by overcompensating for the increased voltage by decreasing system output current), or not cause a measurable response. Accordingly, the process of perturbing the system voltage only requires a minor change in the operation of the switch 37, which may be enacted by increasing (or decreasing) the amount of voltage received in the inverter 17. The increased or decreased new voltage is then evaluated at step 640, as described below.

Once the system voltage is perturbed, the method proceeds to step 640, at which point the processor 21 determines whether the new voltage is above a voltage threshold. The threshold of step 640 may be calculated according to a variety of methods. For example, the threshold may be representative of a specific target output voltage of the solar panel array in relation to a desired use case, such as charging a battery or powering a device. Alternatively, the voltage threshold may be determined as a fraction or percentage of the maximum voltage output of the solar panel array 13. Such is not limited to the examples given, however, and the voltage threshold may be determined according to other criterion without departing from the spirit of the invention.

As shown in FIG. 6, if the voltage is less than the voltage threshold then the method proceeds to step 650, in which case the voltage is increased, and the to step 680, at which point the new voltage is compared to the voltage threshold. If the new voltage is greater than the threshold, the processor 21 determines that a global maximum power point has been achieved. Alternatively, if the new voltage is less than the threshold, the processor 21 returns to step 630, where the voltage is adjusted. Accordingly, steps 630, 640, 650, and 680 of the method form an iterative loop for increasing the voltage until the output voltage overcomes a voltage threshold.

Alternatively, if the processor 21 determines at step 640 that the output voltage is greater than the threshold voltage, the process continues to step 670, at which point the processor 21 compares the power output by the solar panel array 13 to a power threshold. Similar to the voltage threshold described above, the power threshold may be determined as a function of the total power output of the solar panel array 13, a required output to achieve a specific use case, or other criterion. If the processor 21 determines that the output power is greater than the identified power threshold, the process continues to step 690, at which point it is determined that the global maximum power point has been achieved. Alternatively, if the output power is determined to be less than the power threshold, the process reverts to step 630, at which point the voltage is disturbed again. Thus, steps 630, 640, and 670 form a second iterative loop that increases the system voltage until a required power output greater than the power threshold is achieved.

Once the output voltage is greater than the voltage threshold and the output power is greater than the output power threshold, the system is considered to be operating at its global maximum power point. Accordingly, the process ends at step 690, where the processor 21 concludes that a global maximum power point is achieved once the respective power and voltage thresholds of steps 670 and 680 are eclipsed by the output power and voltage of the system.

Figure 7:
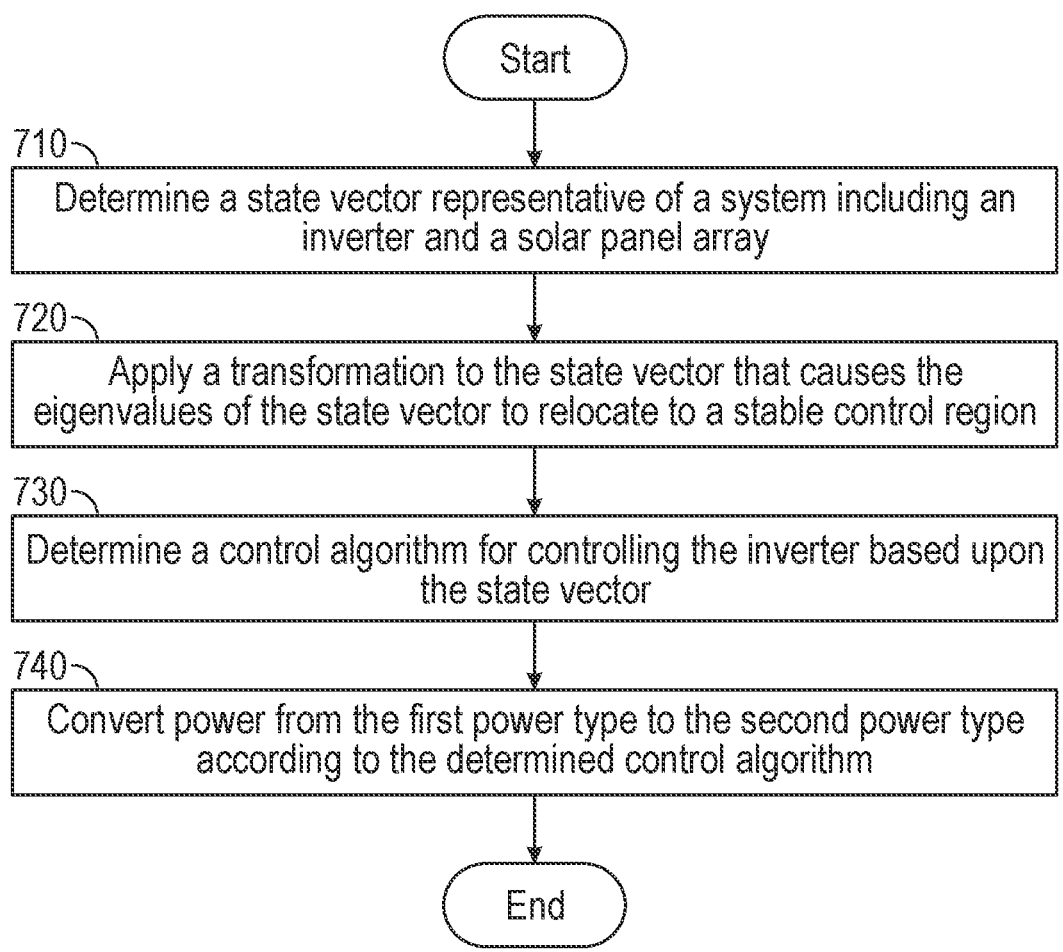
FIG. 7 shows a flowchart of a method in accordance with one or more embodiments of the present disclosure.

FIG. 7 depicts a flowchart of a method for controlling an output power of an inverter. Elements described above that may be used in the method shown in FIG. 7 have been numbered for clarity, but are not limited to such. Initially, in step 710, a state space model of a solar pane system is developed by abstracting the circuit into state space notation, which may be performed by any suitable processor (e.g., processor 21). In particular, the processor 21 of the controller 29 initiates the abstraction process by assuming that the solar panel array 13 is a controllable system, and forming a state vector x(t) containing the instantaneous voltage and current signals received by the inverter 17 from the solar panel array 13. Alternatively, the state vector x(t) can be formed by the controller 29 as a vector containing the voltage and current as a function of a maximum power point tracking (MPPT), or the voltage and current of the solar panel array 13 may be input to the processor 21 during the installation process by an operator.

In step 720, the controller 29 applies a transformation to the state vector that causes eigenvalues of the state vector to relocate to a stable control region 33. In particular, the processor 21 of the controller 29 recursively determines a weighting value $Q_i$ that transitions a single eigenvalue of the state vector x(t) to the stable control region 33. The weighting values $Q_i$ are agglomerated to form a weighting matrix Q and the weighting matrix Q is applied to the system, which causes all eigenvalues to relocate to the stable control region 33.

In step 730, the controller 29 determines a control algorithm for controlling the inverter based upon the relocated state vector x(t). Specifically, the weighting matrix Q and the state vector x(t) are input into a performance index J containing the control signal u(t). The control signal u(t) is determined to be the value that minimizes the performance index J. Accordingly, the control algorithm is defined as outputting a control signal u(t) according to the minimized performance index J.

In step 740, power is converted from a first type to a second type based upon the determined control algorithm. Specifically, based upon the control signal u(t), the controller 29 directs the inverter 17 to change the ratio of voltage and current supplied to the output terminals 19. The inverter 17 contains a reconfigurable fabric circuit 23 containing a voltage gate 39, a current gate 41, and a switch 37, where the voltage gate 39 and the current gate 41 connect the solar panel array 13 to the output terminals 19. Thus, by selectively directing the switch 37 of the reconfigurable fabric circuit 23 to connect to the voltage gate 39 and the current gate 41, the inverter 17 controls the power output to the output terminals 19 by the solar panel array 13. More specifically, the selective connection process creates oscillatory phases in the power, which serves to convert the power from direct current to alternating current, where the frequency of the alternating current is determined according to the number of oscillatory phases.

Accordingly, the aforementioned embodiments as disclosed relate to devices and methods useful for converting power from a first power type to a second power type, and for controlling solar panel arrays for maximum efficiency and/or power output. As a direct consequence of abstracting the solar panel array and the inverter(s), the system can dynamically respond to changes in operating conditions at a system wide level. Furthermore, because the inverter is controlled remotely, multiple inverters and solar panels systems can be controlled at the same time. Finally, because the controller knows the outputs of the system on a panel by panel basis, the controller is able to control the solar panel array to avoid inefficiencies caused by damaged panels or poor weather conditions. Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. An inverter comprising:
    an input terminal configured to receive output power of a first power type from a solar panel array;
    an output terminal configured to transmit output power of a second power type; and
    a processor configured to receive a control algorithm for the inverter via a network connection and control the inverter based upon the received control algorithm,
    wherein a process of determining the control algorithm comprises applying a transformation to a state vector, representative of the inverter and the solar panel array, such that eigenvalues of the state vector are relocated from an initial control region to a stable control region, and determining the control algorithm based upon the relocated eigenvalues.

2. The inverter of claim 1, wherein the stable control region is defined according to Global Maximum Power Point Tracking data.

3. The inverter of claim 1, further comprising a reconfigurable fabric architecture that is configured to be controlled according to the control algorithm.

4. The inverter of claim 1, wherein the network connection connects the inverter to an Internet of Things (IoT) or Internet of Everything (IoE) network.

5. The inverter of claim 1, wherein applying the transformation to the state vector comprises determining a weighting matrix that cause the eigenvalues of the state vector to shift to the stable control region.

6. The inverter of claim 5, wherein individual weighting values of the weighting matrix are calculated in a recursive process for each eigenvalue and are agglomerated to form the weighting matrix.

7. The inverter of claim 5, wherein the process of determining a control algorithm comprises calculating a pseudo inverse of the weighting matrix subsequent to relocating the eigenvalues of the state vector.

8. A system for controlling an output power of an inverter, the system comprising:
    a solar panel array comprising at least one solar cell,
    an inverter configured to convert power from a first power type to a second power type, the inverter comprising:
        an input terminal configured to receive input power of the first power type from the solar panel array;
        an output terminal configured to transmit output power of the second power type; and
        a processor configured to control the inverter according to a control algorithm;
    a controller, the controller being configured to:
        apply a transformation to a state vector, representative of the inverter and the solar panel array, such that eigenvalues of the state vector are relocated from an initial control region to a stable control region; and
        determine, based upon the state vector, the control algorithm for controlling the inverter,
    wherein the inverter is configured to convert power from the solar panel array from the first power type to the second power type according to the determined control algorithm.

9. The system of claim 8, wherein the controller is a component of an Internet of Things (IoT) or Internet of Everything (IoE) network such that the controller is physically separate from the inverter, and the controller and the inverter are connected via a network connection.

10. The system of claim 8, further comprising a bypass diode configured to prevent current from entering the at least one solar cell.

11. The system of claim 8, wherein the controller assumes that the solar panel array is an open loop current source.

12. A method of controlling an output power of an inverter, the method comprising:
    determining a state vector representative of a system including the inverter and a solar panel array;
    transforming the state vector such that eigenvalues of the state vector are relocated from an initial control region to a stable control region;
    determining, based upon the state vector, a control algorithm for controlling the inverter; and
    controlling the inverter to convert power from the solar panel array from a first power type to a second power type according to the determined control algorithm.

13. The method of claim 12, wherein determining the state vector representative of the system comprises assuming that the solar panel array is an open-loop current source.

14. The method of claim 12, wherein the stable control region is defined according to Global Maximum Power Point Tracking data.

15. The method of claim 12, further comprising directing at least one inverter to cease operation according to the control algorithm.

16. The method of claim 12, further comprising transmitting the control algorithm via a network connection to the inverter.

17. The method of claim 12, wherein applying the transformation to the state vector comprises determining a weighting matrix that cause the eigenvalues of the state vector to shift to the stable control region.

18. The method of claim 17, further comprising recursively calculating individual weighting values of the weighting matrix for each eigenvalue and are agglomerating the individual weighting values to form the weighting matrix.

19. The method of claim 17, wherein determining the control algorithm comprises calculating a pseudo inverse of the weighting matrix.

20. The method of claim 18, wherein the control algorithm is representative of a minimum value of a performance index containing the weighting matrix.

* * * * *